United States Patent
Mahieu et al.

(10) Patent No.: US 9,561,981 B2
(45) Date of Patent: Feb. 7, 2017

(54) GLASS PANEL COMPRISING A SOLAR CONTROL LAYER

(71) Applicant: AGC GLASS EUROPE, Louvain-la-Neuve (BE)

(72) Inventors: Stijn Mahieu, Lovendegem (BE); Laurent Dusoulier, Aubel (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 14/776,159

(22) PCT Filed: Feb. 14, 2014

(86) PCT No.: PCT/EP2014/052943
§ 371 (c)(1),
(2) Date: Sep. 14, 2015

(87) PCT Pub. No.: WO2014/139755
PCT Pub. Date: Sep. 18, 2014

(65) Prior Publication Data
US 2016/0031751 A1    Feb. 4, 2016

(30) Foreign Application Priority Data

Mar. 14, 2013  (BE) .................................. 2013/0168
Jun. 27, 2013  (EP) ..................................... 13173992

(51) Int. Cl.
*B32B 17/06* (2006.01)
*B32B 15/04* (2006.01)
*C03C 17/36* (2006.01)

(52) U.S. Cl.
CPC ......... *C03C 17/3618* (2013.01); *C03C 17/366* (2013.01); *C03C 17/3626* (2013.01); *C03C 17/3636* (2013.01); *C03C 17/3642* (2013.01); *C03C 17/3644* (2013.01); *C03C 17/3649* (2013.01); *C03C 17/3652* (2013.01); *C03C 17/3681* (2013.01)

(58) Field of Classification Search
USPC ....... 428/426, 428, 432, 433, 434, 688, 689, 428/697, 699, 701, 702
See application file for complete search history.

(56) References Cited

U.S. PATENT DOCUMENTS

| 7,090,921 | B2 | 8/2006 | Stachowiak et al. |
| 7,582,356 | B2 | 9/2009 | Brochot et al. |
| 2003/0170466 | A1 | 9/2003 | Stachowiak |
| 2004/0241406 | A1 | 12/2004 | Nadaud et al. |
| 2005/0175845 | A1 | 8/2005 | Stachowiak |
| 2006/0222863 | A1 | 10/2006 | Nadaud et al. |
| 2006/0246301 | A1 | 11/2006 | Stachowiak et al. |
| 2006/0257670 | A1 | 11/2006 | Brochot et al. |
| 2008/0311389 | A1 | 12/2008 | Roquiny et al. |
| 2009/0197077 | A1* | 8/2009 | Reutler .................. C03C 17/36 428/336 |
| 2011/0261442 | A1* | 10/2011 | Knoll ..................... C03C 17/36 359/360 |
| 2012/0225304 | A1 | 9/2012 | Imran et al. |
| 2012/0225316 | A1* | 9/2012 | Imran .................... C03C 17/36 428/623 |
| 2012/0225317 | A1 | 9/2012 | Imran et al. |
| 2012/0308811 | A1 | 12/2012 | Roquiny et al. |
| 2013/0117992 | A1 | 5/2013 | Imran et al. |
| 2013/0118674 | A1 | 5/2013 | Imran et al. |

OTHER PUBLICATIONS

U.S. Appl. No. 14/768,068, filed Aug. 14, 2015, Mahieu, et al.
U.S. Appl. No. 14/768,058, filed Aug. 14, 2015, Mahieu.
International Search Report issued May 6, 2014 in PCT/EP2014/052943.
International Preliminary Report and Written Opinion issued Sep. 15, 2015 in PCT/EP2014/052943.
Kamil Zuber, et al., "Enhanced abrasion resistance of ultrathin reflective coatings on polymeric substrates: An improvement upon glass substrates", Wear, vol. 297, No. 1-2, XP055075519, 2013, pp. 986-991.

* cited by examiner

*Primary Examiner* — Lauren R Colgan
(74) *Attorney, Agent, or Firm* — Oblon, McClelland, Maier & Neustadt, L.L.P.

(57) ABSTRACT

The invention relates to a solar control glass panel comprising, on at least one of the surfaces of a glass substrate, a multilayer stack including at least one solar radiation absorption layer, and dielectric coatings surrounding said solar radiation absorption layer. According to the invention, the solar radiation absorption layer is a metal alloy layer made from zirconium and chromium. The multilayer stack includes, between the substrate and the solar radiation absorption layer, as well as on top of the solar radiation absorption layer, at least one coating made of a dielectric material made from a compound selected from among silicon oxide, aluminum oxide, silicon nitride, aluminum nitride, mixed aluminum/silicon nitrides, silicon oxynitride, and aluminum oxynitride. The invention is particularly useful as a motor vehicle glass panel, particularly for the roof, as a building glass panel, or as a household stove door.

26 Claims, No Drawings

GLASS PANEL COMPRISING A SOLAR CONTROL LAYER

CROSS REFERENCE TO RELATED APPLICATION

This application is a 371 of PCT/EP2014/052943, filed on Feb. 14, 2014, and claims priority to Belgium Patent Application 2013/0168, filed on Mar. 14, 2013, and European Patent Application 13173992.2, filed on Jun. 27, 2013.

FIELD OF THE INVENTION

The field of the invention is that of solar-control glazings consisting of a glass substrate bearing a multilayer stack, at least one thin layer of which gives said solar-control properties. This functional layer is combined with dielectric layers whose role is especially to regulate the reflection, transmission and tint properties and the protection against mechanical or chemical impairment of the properties of the glazing.

More precisely, the invention relates to glazings intended to be fitted in buildings, but also in motor vehicles. Depending on these uses, certain required properties may differ as explained later.

Solar-control glazings have a plurality of functionalities. They especially concern the prevention of overheating in the passenger compartment of a motor vehicle, in particular with respect to solar radiation passing through a transparent sunroof, or with respect to a building exposed to solar radiation when this solar radiation is sufficiently intense. According to certain embodiments, this prevention of overheating may be obtained while maintaining appropriate light transmission.

Glazings, especially for motor vehicles, must also participate toward establishing temperature regulation conditions in winter by avoiding energy loss out of the passenger compartment or of the building. The glazings must thus have low-emission properties. They counter the emission of energy radiation from the passenger compartment or the building.

In the case of glazings for buildings, they are furthermore required to be capable of withstanding heat treatments without their color, especially in reflection, being substantially modified. The object is to be able to place side by side heat-treated glazings and others that have not been, without color differences appearing.

In the rest of the description, the optical properties are defined for glazings whose substrate is made of ordinary clear "float" glass 4 mm thick. The choice of the substrate obviously has an influence on these properties. For ordinary clear glass, the light transmission through 4 mm, in the absence of a layer, is approximately 90% with 8% reflection, measured with a source conforming to the D65 "daylight" illuminant normalized by the CIE and at a solid angle of 2°. The energy measurements are taken according to standard EN 410.

The term "glass" is understood to denote an inorganic glass. This means a glass with a thickness at least greater than or equal to 0.5 mm and less than or equal to 20.0 mm, preferentially at least greater than or equal to 1.5 mm and less than or equal to 10.0 mm, comprising silicon as one of the essential constituents of the vitreous material. For certain applications, the thickness may be, for example, 1.5 or 1.6 mm, or 2 or 2.1 mm. For other applications, it will be, for example, about 4 or 6 mm. Clear or extra-clear, or bulk-colored or surface-colored silico-sodio-calcic glasses are preferred.

The presence of a multilayer stack may pose color problems. The market usually demands that glazings offer, both in transmission and in reflection, a coloring that is as neutral as possible and thus of gray appearance. Slightly green or blueish colorings are also possible. The multilayer stacks, and in particular the nature, indices and thicknesses of the dielectric layers surrounding the functional layers, are chosen especially to control these colorings.

Motor vehicle glazings may in theory be multiple to give the vehicle better insulating properties, especially heat insulation. In reality, such implementations are exceptional. The vast majority of these glazings consist of single glazings, which are either monolithic or laminated. In these two cases, in order for the low-emission nature to be suitably expressed, the multilayer stack is necessarily on a face that is not sheltered from mechanical or chemical stresses. The stacks in question must thus have very good resistance to these possible attacking factors.

In practice, to limit the risks of impairment, the multilayer stacks are especially on the face of the glazing oriented toward the passenger compartment. However, even in this position, they must afford very good mechanical strength.

The layer systems according to the invention must also lend themselves to the forming of glazings. Those used in vehicles are especially the subject of heat treatments during forming, especially the bending of glass sheets, or during toughening intended especially to give the glass sheets reinforced mechanical properties. The layers used according to the invention must withstand these treatments without their properties being degraded. Treatments of this type demand temperatures which exceed 600° C. for about 10 minutes. The layers must conserve their qualities when subjected to these temperatures.

In many applications requiring the availability of glazings with high light transmission, the choice of the functional layers demands that they be particularly transparent. The most common is to select one or more metallic layers of very low thickness: for example, one or more silver layers arranged between dielectric layers which protect them and both minimize the reflection and adjust the neutrality. The layer systems obtained in the assembly are limited by having a certain level of fragility, especially mechanical fragility, even in the presence of special protective layers.

For glazings that do not require high light transmission, and even optionally for which the transmission must remain low, the choice of the layer systems affords wider diversity.

PRIOR ART SOLUTIONS

The prior art proposes glazings comprising solar radiation absorbing solar radiation absorbing metallic or metal alloy layers, of nitrides or oxynitrides of various metals and especially of NiCr, Mo, W, Ta, CoCr, Al, Nb or Zr. To enable these metallic layers to have good resistance, especially good mechanical strength, it is also proposed to provide dielectric layers known to be relatively hard. In this field, the most common layers are those of silica, $SiO_2$, and of silicon nitride, $Si_3N_4$.

The prior proposals at least partly satisfy the requirements for the envisaged use of the glazings according to the invention. There nevertheless remain needs for improvement, especially as regards the resistance to heat treatments.

OBJECTIVES OF THE INVENTION

An objective of the invention is in particular to overcome these disadvantages of the prior art.

More precisely, one object of the invention, in at least one of its embodiments, is to provide a glazing equipped with a multilayer stack which is capable of undergoing a heat treatment at high temperature, of toughening and/or bending type, preferably without significant modification of its tint, in particular in substrate-side reflection, such that a glazing that has not been heat-treated can be juxtaposed with its heat-treated version without an observer being able to detect a significant difference in the overall esthetic appearance.

Another object of the invention, in at least one of its embodiments, is to provide a glazing equipped with a multilayer stack which has good thermal, chemical and mechanical stability.

An object of the invention is also, in at least one of its embodiments, to provide a glazing whose multilayer stack can be placed in an outer position without necessarily having to be protected from the external environment by another substrate.

SUMMARY OF THE INVENTION

The invention relates to a solar-control glazing comprising on at least one of the faces of a glass substrate a multilayer stack comprising at least one solar radiation absorbing layer and dielectric coatings surrounding said solar radiation absorbing layer, characterized in that the solar radiation absorbing layer is a metal alloy layer based on zirconium and chromium, the multilayer stack comprising, between the substrate and the solar radiation absorbing layer, and also over the solar radiation absorbing layer, at least one coating made of dielectric material based on a compound selected from silicon oxide, aluminum oxide, silicon nitride, aluminum nitride, mixed aluminum-silicon nitrides, silicon oxynitride and aluminum oxynitride.

The general principle of the invention is based on the presence of a solar radiation absorbing metallic layer which is a metal alloy layer based on zirconium and chromium, said layer being set between at least two layers based on at least one dielectric material listed in claim 1. The inventors have determined that, surprisingly, such a multilayer stack has good chemical, thermal and mechanical durability. Specifically, the solar radiation absorbing metallic layer based on chromium and zirconium brings about a decrease in solar energy transmission, said layer conserving its absorption properties more particularly after a heat treatment.

In the present description, the term "based on zirconium and chromium" refers to a layer comprising at least 25% by weight of chromium and at least 20% by weight of zirconium.

For the solar radiation absorbing layer, the term "metal alloy layer" means a layer having essentially metallic nature. However, it is not excluded for this layer optionally to contain a few traces of nitrogen or oxygen. Specifically, the atmosphere during the deposition of this metallic layer may consist of pure noble gas, for example 100% argon, or the atmosphere may contain a small amount of nitrogen or oxygen originating from neighboring deposition zones. In the case where the dielectric layers which surround the absorbing layer are silicon nitrides, the metallic target intended to form the absorbing layer may even be arranged in the same deposition chamber, without distinct isolation with the silicon nitride deposition zones, since the nitrogen will be predominantly attracted by the silicon. In this case, the surrounding atmosphere may contain a relatively high percentage of nitrogen and thus, even if the nitrogen predominantly combines with silicon, the absorbing metallic layer may contain a small amount of nitrogen, without thereby losing its metallic nature. In the case where the dielectric layers which surround the absorbing layer are oxides or oxynitrides, there may also be a small amount of oxygen therein originating from the neighboring deposition zones in the deposition atmosphere.

Preferably, the layer comprises at least 35%, and advantageously at least 40% and even at least 45% by weight of zirconium. Preferably, the layer comprises between 20% and 75% by weight of zirconium, advantageously between 25% and 75% or between 30% and 75% by weight of zirconium, and favorably between 45% and 65% by weight of zirconium.

The term "layer based on a dielectric material" also means layers doped with at least one other element, containing up to a maximum of about 10% by weight of this other element, these layers having dielectric properties that do not differ in practice from the layers consisting of said dielectric material. Thus, for example, when the layer is made of silicon nitride or oxide, it may contain up to 10% by weight of aluminum (for example layers deposited by the cathodic sputtering process using a silicon target containing up to 10% by weight of aluminum). The dielectric layers according to the invention may also consist of several individual layers comprising or essentially consisting of these same materials. The dielectric layers may also be deposited via the well-known technique known as PECVD (plasma-enhanced chemical vapor deposition).

Thus, the invention is founded on an entirely novel and inventive approach based on the selection of a solar radiation absorbing metallic layer which is based on a chromium zirconium alloy.

Advantageously, the glazing according to the invention is such that the solar radiation absorbing metallic layer based on chromium and zirconium also comprises an additional metal selected from Ti, Nb, Ta, Ni, Sn and W.

Preferably, the solar radiation absorbing layer has a geometrical thickness of between 0.5 nm and 30 nm, advantageously of between 1 nm and 30 nm, preferably of between 2 nm and 25 nm.

The metallic layer based on chromium and zirconium, which has such thicknesses, has infrared absorption properties that are most particularly required for its use in the multilayer stack for motor vehicle or building glazing or as a glazed element of a household electrical appliance, such as an oven door.

According to one embodiment of the invention, the solar radiation absorbing layer preferably has a geometrical thickness of between 10 and 25 nm and advantageously between 12 and 22 nm. This embodiment of the invention is most particularly suitable when the solar radiation absorbing layer forms the or at least one functional layer of the multilayer stack, i.e. when it constitutes the or one of the fundamental layers for obtaining solar-control properties.

According to another embodiment of the invention, the solar radiation absorbing layer preferably has a geometrical thickness of between 0.5 and 30 nm, advantageously between 1 and 10 nm and preferentially between 2 and 5 nm. This other embodiment of the invention is most particularly suitable when the solar radiation absorbing layer is an additional layer of the functional layer of the multilayer stack, intended to improve the solar-control properties already obtained with the functional layer(s).

According to an advantageous embodiment, the glazing according to the invention is such that the layer of dielectric material between the substrate and the solar radiation absorbing layer has an optical thickness of at least 10 nm and of not more than 200 nm, preferentially of at least 20 nm and of not more than 180 nm.

The optical thickness of a layer of dielectric material is obtained by multiplying the geometrical (physical) thickness of the layer under consideration by the refractive index of the material constituting it.

According to a preferred embodiment, the glazing according to the invention is such that the layer of dielectric material located over the solar radiation absorbing layer has an optical thickness of at least 15 nm and of not more than 200 nm.

According to a first preferred embodiment, the solar radiation absorbing metallic layer is the base functional layer of the multilayer stack. The advantage of this multilayer stack is that it is extremely simple and very resistant.

Preferably, the multilayer stack comprises at least two solar radiation absorbing layers. This characteristic makes it possible more easily to adapt optical and thermal properties of the multilayer stack as desired. Advantageously, these two solar radiation absorbing layers are separated by a dielectric layer, for example made of silicon nitride. A particularly suitable structure is the following:

substrate/$Si_3N_4$/CrZr/$Si_3N_4$/CrZr/$Si_3N_4$.

According to a second preferred embodiment, the glazing according to the invention is such that the multilayer stack comprises at least one additional silver-based metallic layer such that the or each silver-based layer is surrounded by a dielectric coating. This dielectric coating may be formed from a material as described above in relation with the other embodiments of the invention. It may also be any dielectric material that is well known in the field, for instance zinc stannate or ZnO, which may or may not be doped.

In this second embodiment, the base functional layer of the multilayer stack is the silver-based layer which reflects infrared radiation, thus allowing greater solar-control efficiency while at the same time conserving higher light transmission and thus a significant gain in selectivity. The addition of an additional silver-based layer is surprising since this type of layer generally shows poor resistance to high-temperature heat treatment and moreover embrittles the multilayer stack assembly from the mechanical and chemical viewpoint. In general, the presence of a silver layer prevents the positioning of the multilayer stack in contact with the outer environment and requires the protection of the multilayer stack using an additional substrate. The inventors have discovered, surprisingly, that the invention makes it possible to overcome these drawbacks.

The combination of a silver-based layer with the solar radiation absorbing layer makes it possible, firstly, simultaneously to obtain infrared radiation-reflecting properties, afforded by the silver-based layer, combined with solar radiation absorbing properties.

According to a first preferred form of this second embodiment, at least one of the dielectric coatings comprises at least two dielectric layers and the solar radiation absorbing metallic layer is inserted between these two dielectric layers of this dielectric coating. The inventors have found that this configuration effectively separates the infrared-reflecting function from the solar radiation absorbing function, which makes it possible more easily to optimize the two functions, in particular when it is desired to improve the crystallographic quality of the silver to obtain lower emissivity, for example using a layer based on ZnO under the silver, which is often referred to as a wetting layer, and/or over the silver, without loss of absorption function of the solar radiation absorbing metallic layer. Furthermore, this arrangement better protects the solar radiation absorbing metallic layer during the heat treatment so that it integrally conserves its absorption function as much as possible.

Preferably, the first dielectric layer of the first dielectric coating, deposited on the glass substrate and in contact therewith, is a layer of mixed zinc-tin oxide, advantageously containing at least 20% tin, even more preferentially a layer of mixed zinc-tin oxide in which the zinc-tin proportion is close to 50-50% by weight ($Zn_2SnO_4$). This arrangement is advantageous for the resistance to high-temperature heat treatment. The mixed zinc-tin oxide forms an excellent barrier to the alkali ions migrating from the glass substrate at the high temperature of the heat treatment, especially the toughening treatment. It has and also conserves good adhesion to the glass substrate. It also has a good deposition rate when compared, for example, with $SiO_2$ or $Al_2O_3$, and it shows good durability when compared, for example, with pure ZnO or bismuth oxide. It may also be advantageous in that it has less of a tendency to generate haze after a heat treatment of the stack, when compared, for example, with Ti or Zr oxides. The layer consisting of an oxide, in direct contact with the substrate, advantageously has a thickness of at least 5 nm, preferably of at least 8 nm and more preferentially of at least 10 nm. These minimum thickness values make it possible, inter alia, to ensure the chemical durability of the product that has not been heat-treated, but also to ensure the resistance to the heat treatment.

Preferably, the two said dielectric layers sandwiching the solar radiation absorbing metallic layer based on chromium and zirconium are based on silicon nitride or aluminum nitride. This ensures very good protection of the solar radiation absorbing metallic layer during the high-temperature heat treatment.

Preferred but in no way limiting examples of this embodiment may be represented schematically as follows:

G/$Si_3N_4$/CrZr/$Si_3N_4$/D/ZnO/Ag/AZO/$Si_3N_4$/ZnO/Ag/ AZO/$Si_3N_4$/CrZr/$Si_3N_4$

G/D/ZnO/Ag/AZO/D/ZnO/Ag/AZO/D/$Si_3N_4$/CrZr/ $Si_3N_4$;

G/$Si_3N_4$/CrZr/$Si_3N_4$/D/ZnO/Ag/AZO/D/ZnO/Ag/ AZO/D/$Si_3N_4$[/TOP];

G/$Si_3N_4$/CrZr/$Si_3N_4$/D/ZnO/Ag/B/D/ZnO/Ag/B/D/ TOP

G/$Si_3N_4$/CrZr/$Si_3N_4$/D/ZnO/Ag/AZO/D/$Si_3N_4$/D/ ZnO/Ag/AZO/D/$Si_3N_4$[/TOP];

G/D/ZnO/Ag/AZO/D/$Si_3N_4$/CrZr/$Si_3N_4$/D/ZnO/Ag/ AZO/D/$Si_3N_4$[/TOP];

G/D/ZnO/Ag/B/D/$Si_3N_4$/CrZr/$Si_3N_4$/D/ZnO/Ag/B/D/ $Si_3N_4$[/TOP];

G representing the substrate, preferably a sheet of ordinary sodio-calcic glass; B representing a layer acting as a barrier to the oxidation of the silver, which is well known in the field; AZO representing a barrier layer based on zinc oxide, optionally doped with aluminum, deposited from a ceramic (cathode) target of zinc oxide (optionally doped with aluminum) sputtered in an atmosphere based on argon with little or no oxygen; D representing one or more dielectric layers, especially based on zinc stannate, doped or undoped ZnO, or another material known in the field and which is suitable for this type of layer stacking, for example $TiO_2$, $ZrO_2$ or a mixture thereof, or a nitride such as AN. The term "TOP" represents an upper protective layer containing Ti and/or Zr, said layer being in metallic, oxidized or nitrided form. The term "[/TOP]" means that this upper protective layer is optional. As a variant, AZO may be replaced with other barriers that are well known in the field and suited to the desired properties for the formed layer system, for instance a Ti oxide, which is undoped or doped with niobium or zirconium, preferably obtained from a ceramic target formed from the oxide to be deposited, or pure ZnO. The examples given above use CrZr as solar radiation absorbing layer as concrete examples, but CrZr may also be replaced with another material based on zirconium and chromium, such as CrZrNb, CrZrW, CrZrNi, . . . , in pure metallic form or with traces of nitrogen or oxygen.

Preferably, according to this first form of the second embodiment of the invention, the layer system comprises, at least once, the following succession of layers: "silicon or aluminum nitride or a mixture thereof/solar radiation absorbing layer/silicon or aluminum nitride or a mixture thereof/intercalating transparent oxide/wetting layer based on zinc oxide/additional silver-based metallic layer". It has been found that the use of a wetting layer based on ZnO with insertion of an intercalating transparent oxide layer between the nitride layer protecting the solar radiation absorbing layer and the wetting layer makes it possible to greatly reduce, or to prevent, the formation of marks that are unacceptable in the visual appearance of the coated substrate that has undergone a high-temperature heat treatment, which have a tendency to be formed during the heat treatment in the absence of this specific succession of layers. It has also been found that, without this intercalating transparent oxide layer, the surface electrical resistance, and thus also the emissivity, have a tendency to increase undesirably following the heat treatment, whereas, by virtue of the presence of this intercalating oxide layer, the emissivity is at least conserved, or even beneficially reduced, following the heat treatment. The intercalating transparent oxide layer may be an oxide based on ZnO, $SnO_2$, $TiO_2$, $ZrO_2$ or a mixture thereof, while being different from the wetting layer. Preferably, the intercalating transparent oxide layer is a mixed zinc-tin oxide containing at least 20% tin and at least 10% zinc.

According to a second preferred form of this second embodiment, the additional silver-based metallic layer is located in the stack directly over and/or under the solar radiation absorbing metallic layer.

The inventors have determined, surprisingly, that the presence of the solar radiation absorbing layer makes it possible to reduce the risks of chemical deterioration of the silver-based layer when said silver-based layer is in direct contact with the solar radiation absorbing layer.

Preferably, according to this second form of the second embodiment, the glazing according to the invention is such that the silver-based metallic layer(s), if there are several of them, have a thickness of at least 9 nm, preferentially of at least 13 nm and of not more than 23 nm, more preferentially of at least 15 nm and of not more than 22 nm.

According to this embodiment, the solar radiation absorbing metallic layer preferably has a geometrical thickness of between 0.5 and 8 nm and advantageously between 0.5 and 5 nm.

According to this embodiment, this solar radiation absorbing layer may be placed either under the additional silver-based layer or over the silver-based layer. Preferably, it is placed on either side of the additional silver-based metallic layer, each layer preferably having a thickness within the range indicated above, i.e. preferably between 0.5 and 5 nm. It has been found that this is the best arrangement for spreading the solar radiation absorption on either side of the infrared-reflecting layer.

According to a first preferred implementation of the first embodiment, the glazing according to the invention is such that it comprises on at least one of the faces of a glass substrate a multilayer stack successively comprising at least:
  A layer made of a dielectric material based on at least one chemical compound selected from the group consisting of silicon oxide, aluminum oxide, silicon nitride, aluminum nitride, mixed aluminum-silicon nitrides, silicon oxynitride and aluminum oxynitride, preferentially from silicon nitride, aluminum nitride and mixed aluminum-silicon nitrides, the layer of dielectric material having an optical thickness of at least 10 nm and of not more than 200 nm, preferentially of at least 20 nm and of not more than 180 nm;
  A solar radiation absorbing metallic layer comprising from 20% to 75%, preferably from 45% to 65% by weight of zirconium and at least 25%, preferably at least 35% by weight of chromium, and having a geometrical thickness of at least 1 nm, preferentially of at least 3 nm, and of not more than 30 nm, preferentially of at least 3 nm and of not more than 25 nm;
  A layer made of a dielectric material based on at least one chemical compound selected from the group consisting of from among silicon oxide, aluminum oxide, silicon nitride, aluminum nitride, mixed aluminum-silicon nitrides, silicon oxynitride and aluminum oxynitride, preferentially from silicon nitride, aluminum nitride and mixed aluminum-silicon nitrides, the layer of dielectric material having an optical thickness of at least 15 nm and of not more than 200 nm.

According to a second preferred implementation of the first embodiment, the glazing according to the invention is such that it comprises on at least one of the faces of a glass substrate a multilayer stack successively comprising at least:
  A layer made of a dielectric material based on at least one chemical compound selected from the group consisting of silicon oxide, silicon nitride and silicon oxynitride, the layer of dielectric material having an optical thickness of at least 10 nm and of not more than 200 nm, preferentially of at least 20 nm and of not more than 180 nm;
  A solar radiation absorbing metallic layer comprising from 20% to 75%, preferably from 45% to 65% by weight of zirconium and at least 25%, preferably at least 35% by weight of chromium, and having a geometrical thickness of at least 1 nm, preferentially of at least 3 nm, and of not more than 30 nm, preferentially of at least 3 nm and of not more than 25 nm;
  A layer made of a dielectric material with an optical thickness of at least 15 nm and of not more than 400 nm, preferably between 20 and 200 nm, based on at least one chemical compound selected from the group consisting of silicon nitride and silicon oxynitride.

According to a preferred implementation of the first form of the second embodiment, the layer system comprises n additional silver-based metallic layers, with n≥1, each additional silver-based metallic layer being surrounded by layers of dielectric material, and comprises at least once the following succession of layers: "silicon or aluminum nitride or a mixture thereof/solar radiation absorbing layer/silicon or aluminum nitride or a mixture thereof/intercalating transparent oxide/wetting layer based on zinc oxide/additional silver-based metallic layer", in which the additional silver-based metallic layer has a geometrical thickness of at least 8 nm and the solar radiation absorbing layer has a geometrical thickness of between 0.5 and 8 nm. It may be a layer system having two or three, or even four, silver-based metallic layers, a solar radiation absorbing layer, surrounded by its specific dielectric layers, preferably being placed between the first and the second silver-based layer starting from the substrate. It has been discovered that this particular succession of layers makes it possible to greatly reduce, or to prevent, the formation of colored marks that are observed after heat treatment when this sequence is not respected, and in particular when the intercalating transparent oxide layer is not present between the nitride layer that protects the solar radiation absorbing layer and the wetting layer based on ZnO. It has also been found that, by virtue of the presence of this intercalating oxide layer, the surface electrical resistance, and thus also the emissivity, are at least conserved, or even beneficially reduced, following the heat treatment, instead of increasing undesirably during the heat treatment.

According to a preferred implementation of the second form of the second embodiment, the glazing according to the invention is such that it comprises on at least one of the faces of a glass substrate a multilayer stack successively comprising at least:

A layer made of a dielectric material based on at least one chemical compound selected from the group consisting of silicon and/or aluminum nitride or oxynitride, the layer of dielectric material having an optical thickness of at least 10 nm and of not more than 200 nm, preferentially of at least 20 nm and of not more than 180 nm, A solar radiation absorbing metallic layer comprising from 20% to 75%, preferably from 45% to 65% by weight of zirconium and at least 25%, preferably at least 35% by weight of chromium, and having a geometrical thickness of at least 0.5 nm, preferentially of at least 1 nm, and of not more than 8 nm, preferentially of at least 1 nm and of not more than 5 nm, An additional silver-based metallic layer having a geometrical thickness of at least 9 nm, preferentially of at least 13 nm, and of not more than 22 nm, A second solar radiation absorbing metallic layer comprising from 20% to 75%, preferably from 45% to 65% by weight of zirconium, the remainder being formed of chromium, and having a geometrical thickness of at least 0.5 nm, preferentially of at least 1 nm, and of not more than 8 nm, preferentially of at least 1 nm and of not more than 5 nm, A layer of a dielectric material based on silicon nitride or oxynitride having an optical thickness of at least 15 nm and of not more than 400 nm, preferably between 20 and 200 nm.

According to the four preceding implementations, other additional layers may be added, either directly to the substrate, or as an outer protective layer, or inside the stack of the multilayer stack, so as to give the base multilayer stack additional properties and/or protection, for instance additional outer protection against mechanical or chemical attacking factors, a barrier against alkalis originating from the substrate, different optical properties, an improvement in the electrical properties of the metallic layers, an improvement in the deposition rate, or any additional function. The additional layers must, however, preferably be chosen so that they do not disrupt the ability of the multilayer stack to undergo a high-temperature heat treatment. In particular, care will advantageously be taken to ensure that these additional layers do not undergo substantial modifications, especially structural modifications, during the heat treatment, to prevent them from resulting in modifications in the optical properties of the multilayer stack during the heat treatment.

The heat treatments, especially of bending/toughening type, may also induce more or less significant modifications in the optical properties and especially in the tints. Preferentially, these variations should be minimized such that, whether or not they are heat-treated, the glazings have a virtually unchanged appearance.

Conventionally, measurement of the colorimetric variations is performed from the coordinates of the CIELAB system. The colorimetric variation is expressed by the expression noted $\Delta E^*$, which expression corresponds to the formula:

$$\Delta E^* = (\Delta L^{*2} + \Delta a^{*2} + \Delta b^{*2})^{1/2}$$

in which $\Delta L^*$ represents the difference between the colorimetric coordinates $L^*$ of the glazing before and after heat treatment, $\Delta a^*$ represents the difference between the colorimetric coordinates $a^*$ of the glazing before and after heat treatment, $\Delta b^*$ represents the difference between the colorimetric coordinates $b^*$ of the glazing before and after heat treatment.

More particularly, and preferably, the glazing according to the invention has a colorimetric variation in glass-side reflection, $\Delta E^*_{rg}$:

$$\Delta E^*_{rg} = (\Delta L^{*2}_{rg} + \Delta a^{*2}_{rg} + \Delta b^{*2}_{rg})^{1/2}$$

of less than 8, preferentially less than 5, advantageously less than 3, and even preferentially less than 2, when said glazing is subjected to a temperature of at least 630° C. and of not more than 670° C. for 7 minutes.

The invention is particularly useful for obtaining very good stability of the tint in substrate-side reflection during a toughening and/or bending high-temperature heat treatment. The tint in substrate-side reflection is, in many applications, the tint that is the most noticed by an observer, since it is this face which draws his attention depending on the conditions of use of the glazing. The slightest difference in tint is thus more readily apparent.

The inventors have found, surprisingly, that the invention, with the absorbent metallic layer based on chromium and zirconium, makes it possible to achieve exceptional tint stability in glass-side reflection, which it was not possible to achieve as easily with the proposals of the prior art, and especially by using NiCr as absorbent material as proposed previously.

Furthermore, the invention makes it possible to increase somewhat the substrate-side light reflection, which is often desired in commercial applications.

Additionally, the glazing according to the invention also preferably has a colorimetric variation in transmission, $\Delta E^*_{TL}$:

$$\Delta E^*_{TL} = (\Delta L^{*2}_{TL} + \Delta a^{*2}_{TR} + \Delta b^{*2}_{TL})^{1/2}$$

of less than 8, preferentially less than 5, more preferentially less than 3, when said glazing is subjected to a temperature of at least 630° C. and of not more than 670° C. for 7 minutes.

The glazing according to the invention has, optionally in addition to the two preceding properties, a colorimetric variation in layer-side reflection, $\Delta E^*_{Rl}$:

$$\Delta E^*_{Rl} = (\Delta L^{*2}_{Rl} + \Delta a^{*2}_{Rl} + \Delta b^{*2}_{Rl})^{1/2}$$

of less than 8, preferentially less than 5, when said glazing is subjected to a temperature of at least 630° C. and of not more than 670° C. for 7 minutes.

According to a particular embodiment, the glazing according to the invention is such that the thickness of the solar radiation absorbing metallic layer is chosen so that the light transmission for a substrate consisting of clear glass 4 mm thick is at least equal to 2% and not more than 75%. In the case of the use as a motor vehicle sunroof, the light transmission will preferably be between 2% and 10%, advantageously between 6% and 8%. In the case of application in a building, the light transmission will preferably be between 10% and 70%, advantageously between 10% and 60%, favorably between 10% and 50% and preferentially between 20% and 40%. Specifically, the solar radiation absorbing metallic layer governs the light and energy transmissions, and, as such, the thicker it is, the more it absorbs.

According to a particular embodiment, the glazing according to the invention is such that the optical thickness of the dielectric layers is chosen so that the layer-side reflection is at least 1% and not more than 55%. The dielectric layers, in particular the upper layer, especially governs the reflection of the system. In a known manner, the alternation of layers with high and low refractive indices makes it possible to control the reflection. The thickness of the layers is also a determining factor. Within the limit of the thicknesses indicated previously, increasing the thickness of the layer of dielectric material located over the solar radiation absorbing metallic layer reduces the intensity of the layer-side reflection and increases the substrate-side reflection.

As a variant, when low light reflection is desired, especially layer-side reflection, two or even more functional layers formed from solar radiation absorbing metallic layers are preferably arranged with a dielectric layer between these two layers, according to the following structure, for example: dielectric layer as described in the main claim/solar radiation absorbing layer/dielectric layer as described in the main claim/solar radiation absorbing layer/dielectric layer as described in the main claim. The desired total thickness for the solar radiation absorption is subdivided into two, or even into as many absorbing layers used. As an illustration, here is a preferred concrete structure: $Si_3N_4$/CrZr/$Si_3N_4$/CrZr/$Si_3N_4$. This structure facilitates the production of very low layer-side light reflection, for example only 2%, or even only 1%.

According to a preferred embodiment of the invention, the substrate-side measured light reflection is at least 27%, preferably at least 30% and advantageously at least 35%. This characteristic makes it possible to obtain a pleasant esthetic effect that is highly appreciated on the commercial market in certain regions, especially by virtue of the shiny appearance of the face of the glazing.

The multilayer stack of the glazing according to the invention makes it possible to obtain this esthetic effect more easily, especially by appropriately adjusting the optical thickness of the dielectrics so as to control correctly the optical interference effect. One appropriate means consists in limiting the optical thickness of the first dielectric coating, placed between the substrate and the solar radiation absorbing layer, to a low value. However, this solution has a limit since the thickness of this first dielectric coating must be sufficient to allow high-temperature heat treatment of the layer system without deterioration of its properties, especially on account of the migration of elements originating from the substrate. Another preferred means consists in giving the second dielectric coating, placed over the solar radiation absorbing layer, a high optical thickness that is within a specific range. Preferably, the second dielectric coating, placed over the solar radiation absorbing layer, has an optical thickness (geometrical thickness multiplied by the refractive index of the material) of between 70 and 170 nm, preferably between 80 and 140 nm and advantageously between 110 and 130 nm.

Preferably, the light reflection measured on the substrate side is at least 2 times, advantageously at least 2.5 times and preferentially at least 3 times greater than the light reflection measured on the multilayer-stack side. Preferably, the light reflection measured on the substrate side is at least 15% and advantageously at least 20% greater than the light reflection measured on the multilayer-stack side. Given that, in order to obtain the best solar-control effect, the layer is placed in position 2 (starting from the exterior), this characteristic makes it possible to obtain an exterior reflection (measured on the substrate side) allowing the production of the desired pleasant esthetic effect while at the same time avoiding the mirror effect when looking through the glazing from the interior of the space closed by the glazing, thus improving the light transmission and the visibility through the glazing. This combination of high exterior reflection, to obtain a desired esthetic effect, with low interior reflection is an essential characteristic of this embodiment of the invention. The mirror effect viewed from the interior, which prevents correct vision through the glazing from the chamber closed by the glazing, is thus avoided. A high optical thickness of the second dielectric coating is a fundamental condition.

According to an advantageous embodiment for obtaining this difference in light reflection between the substrate side and the multilayer-stack side, the coating of dielectric material placed over the solar radiation absorbing layer comprises a material with a high refractive index, of greater than 2. In the context of the present invention, this dielectric with a high refractive index is a material that withstands the heat treatment without significant structural modification. A specific example of such a material is titanium oxide, for example doped with zirconium or niobium, especially a mixture of titanium oxide and zirconium oxide in a proportion of 40% to 60% each. Another example of such a material is zirconium oxide. Preferably, this high-index material is placed between the solar radiation absorbing layer and the outermost dielectric layer of the stack.

Preferably, the layer system ends with a thin protective layer based on a mixed titanium-zirconium oxide.

Glazings according to the invention find various applications by adapting their properties via adjustment of the layers and especially of their thicknesses.

The glazings according to the invention may form part of double glazings and, in this case, the multilayer stack may be placed in the space between the two sheets of glass, which limits the risks of impairment, especially mechanical impairment. Nevertheless, two of the significant features of the multilayer stacks proposed for the glazings according to the invention are their mechanical strength and their chemical resistance. In the embodiments without an additional silver-based metallic layer or with an additional silver-based metallic layer but without oxide in the multilayer stack, this resistance or strength is such that they may be used with the multilayer stack exposed without any other protection. In the latter case, the glazing may equally be composed of a single sheet of glass, the multilayer stacks being applied onto one face of this sheet. It may also be a laminated glazing comprising two or more sheets of glass, the sheets being connected by means of intercalating sheets of thermoplastic material according to the conventional techniques in this field.

In these applications on a single glazing, the multilayer stack is not protected from the environment. Even in the case of laminated glazing, the layers may be on an outer face so that they can play their role in controlling energy transmission by acting on the emissivity of the surface.

When the favored functionality is the low-emissive nature of the glazing, the multilayer stack is preferably arranged on the face oriented toward the interior of the vehicle or building. This position leads to the greatest reflection of the long-wavelength infrared rays to keep the heat inside the passenger compartment or the building. For vehicles, this position corresponds to the layer on the face oriented toward the passenger compartment. In this position, the multilayer stack resists all the better when the stresses, especially for fixed glazings (sunroof, rear window, etc.), are relatively limited.

The glazing according to the invention thus finds its application as a glazed element of a motor vehicle: sunroof, windshield, side window, rear window (the multilayer stack preferably being on the face exposed to the passenger compartment) and a glazing element of buildings.

More particularly, the glazing according to the invention finds its application as a motor vehicle sunroof.

Specifically, motor vehicle constructors are in search of a solution that avoids placing a curtain (veil) in the roof for protecting against sunlight. The absence of this curtain leads to a saving in weight (~6 kg) and thus to a reduction in fuel consumption, resulting in less expelled $CO_2$. Without any curtain, the thermal comfort must, despite everything, be ensured for the passengers, i.e. no overheating in summer and no cold wall sensation in winter. In an electric vehicle, there is no heat coming from the thermal engine that can be used to heat the passenger compartment of the vehicle and the body heat must absolutely be maintained inside (no loss through the sunroof).

The glazing according to the invention also finds its application as a glazed element of a household electrical appliance such as an oven door, where it may also provide a desired esthetic effect. It shows good resistance to the various chemical and/or mechanical attacking factors due to this particular type of application.

As already indicated above several times, the glazing according to the invention obviously also finds its application as a glazed element of a building. In this application case, the glazing may form a double or triple glazing with the multilayer stack arranged facing the closed space inside the multiple glazing. The glazing may also form a laminated glazing whose multilayer stack may be in contact with the thermoplastic adhesive material connecting the substrates, in general PVB. The glazing according to the invention is, however, particularly useful when the multilayer stack is facing the outer environment, whether it is a single glazing or a laminated glazing, but also optionally a multiple glazing.

Needless to say, the glass substrate may be a bulk-tinted glass, such as a gray, blue or green glass, to absorb solar radiation in addition, or to form a private space with low light transmission so as to dissimulate the passenger compartment of the vehicle, or an office in a building, from external regard.

As a variant of the various embodiments including an additional silver-based metallic layer, the invention also includes the introduction not only of a single silver-based metallic layer but also of two, or even three, or even four, silver-based metallic layers. In this case, the solar radiation absorbing metallic layer(s) may be arranged in immediate proximity (on either side or on one side or the other) to several, or to each, silver-based layer(s). According to a first mode for implementing said variant, the solar radiation absorbing metallic layers will preferably be arranged on either side of the first silver-based metallic layer starting from the substrate. According to a second mode for implementing said variant, the solar radiation absorbing metallic layers will preferably be arranged between two dielectric layers of one and the same dielectric coating. Dielectric layers based on silicon and/or aluminum nitride or oxynitride are preferably arranged between each silver-based metallic layer according to a repetition of the examples with a single functional layer.

DESCRIPTION OF PREFERRED EMBODIMENTS OF THE INVENTION

Examples of glazings according to the invention, but also comparative examples ("R"), are given in table I below. The optical properties are defined, as single glass, for glazings whose substrate is made of ordinary clear "float" glass 4 mm thick. The layers are in order, from left to right, starting from the glass. The approximate geometrical thicknesses are expressed in nm.

Tables I and Ia: Examples of glazings according to the invention and comparative examples of the performance of glazings according to the invention with prior art glazings, the coatings being deposited on clear glass 4 mm thick. The light transmissions (TL) and the layer-side light reflections (Rl) and glass-side light reflections (Rg) are also indicated (in %) for certain examples. In the comparative examples below, NiCr is an alloy containing 80% of Ni and 20% by weight of Cr. in the examples according to the invention below, CiZr is an alloy containing 40% of Cr and 60% by weight of Zr.

TABLE I

| Ex. | Coating | TL | Rl | Rg | $\Delta E^*_{Tl}$ | $\Delta E^*_{Rg}$ |
|---|---|---|---|---|---|---|
| 1R | SiN (20 nm)/NiCr (8.5 nm)/SiN (35 nm) | 39 | 11 | 17 | 1.70 | 3.84 |
| 2R | SiN (20 nm)/NiCr (13.7 nm)/SiN (35 nm) | 27 | 15 | 25 | 2.61 | 2.32 |
| 3R | SiN (20 nm)/NiCr (22 nm)/SiN (35 nm) | 14 | 22 | 36 | 3.56 | 1.74 |
| 4R | SiN (87 nm)/NiCr (13.7 nm)/SiN (30 nm) | 28 | 22 | 17 | 1.95 | 4.60 |
| 1 | SiN (20 nm)/CrZr (12.5 nm)/SiN (35 nm) | 34 | 17 | 25 | 0.96 | 0.30 |
| 2 | SiN (20 nm)/CrZr (20.5 nm)/SiN (35 nm) | 23 | 20 | 32 | 3.25 | 1.03 |
| 3 | SiN (20 nm)/CrZr (33 nm)/SiN (35 nm) | 12 | 22 | 39 | 3.72 | 0.96 |
| 4 | SiN (87 nm)/CrZr (20.5 nm)/SiN (30 nm) | 23 | 24 | 23 | 2.76 | 1.74 |

TABLE Ia

| | Coating (thickness in nm) | | | | | | | | | |
|---|---|---|---|---|---|---|---|---|---|---|
| Ex. | SiN | CrZr | SiN | CrZr | SiN | TL | Rl | Rg | $\Delta E^*_{Tl}$ | $\Delta E^*_{Rl}$ | $\Delta E^*_{Rg}$ |
| 18 | 28.5 | 7.8 | 27.4 | 0.0 | 0.0 | 33.3 | 24.1 | 17.4 | 0.8 | 1.1 | 1.2 |
| 19 | 22.9 | 7.9 | 23.9 | 0.0 | 0.0 | 31.1 | 25.4 | 17.6 | 0.7 | 0.9 | 1.1 |
| 20 | 10.0 | 4.3 | 34.0 | 2.0 | 26.5 | 38.4 | 9.0 | 25.0 | 0.7 | 1.7 | 1.3 |

TABLE Ia-continued

| | Coating (thickness in nm) | | | | | | | | | | |
|---|---|---|---|---|---|---|---|---|---|---|---|
| Ex. | SiN | CrZr | SiN | CrZr | SiN | TL | Rl | Rg | $\Delta E^*_{Tl}$ | $\Delta E^*_{Rl}$ | $\Delta E^*_{Rg}$ |
| 21 | 26.0 | 11.0 | 46.0 | 0.0 | 0.0 | 32.6 | 7.4 | 31.0 | 0.5 | 7.3 | 0.6 |
| 22 | 54.1 | 4.4 | 64.5 | 7.0 | 44.8 | 22.5 | 5.2 | 6.6 | 1.1 | 2.5 | 2.6 |
| 23 | 22.9 | 7.9 | 23.9 | 0.0 | 0.0 | 31.1 | 25.4 | 17.6 | 0.7 | 0.9 | 1.1 |
| 24 | 72.1 | 4.0 | 50.9 | 6.5 | 20.0 | 20.9 | 16.2 | 8.3 | 1.1 | 0.6 | 0.6 |
| 25 | 54.5 | 2.9 | 89.4 | 9.6 | 34.2 | 21.2 | 19.8 | 12.0 | 1.2 | 2.0 | 2.3 |
| 26 | 95.0 | 5.7 | 70.7 | 4.5 | 19.0 | 20.9 | 21.9 | 13.5 | 0.7 | 2.3 | 2.2 |
| 27 | 100.0 | 1.8 | 28.7 | 5.1 | 51.0 | 38.6 | 3.4 | 26.5 | 0.7 | 0.9 | 3.9 |
| 28 | 100.0 | 1.8 | 28.7 | 5.1 | 47.0 | 38.5 | 3.6 | 25.5 | 0.7 | 1.0 | 3.7 |
| 29 | 129.1 | 5.2 | 52.0 | 0.0 | 0.0 | 45.8 | 4.9 | 30.0 | 0.9 | 1.2 | 3.8 |
| 30 | 140.0 | 6.8 | 39.0 | 0.0 | 0.0 | 37.4 | 10.3 | 26.3 | 1.0 | 2.6 | 3.6 |
| 31 | 138.0 | 6.8 | 39.0 | 0.0 | 0.0 | 37.4 | 10.1 | 26.0 | 1.0 | 2.2 | 3.6 |
| 32 | 39.0 | 1.0 | 79.3 | 6.0 | 118.7 | 29.0 | 28.0 | 13.9 | 1.4 | 2.6 | 1.8 |
| 33 | 17.7 | 4.4 | 60.0 | 4.9 | 25.0 | 24.6 | 14.1 | 9.8 | 0.6 | 0.1 | 0.6 |
| 34 | 78.3 | 3.0 | 69.4 | 5.8 | 62.6 | 30.9 | 4.7 | 10.8 | 1.8 | 7.8 | 4.6 |
| 35 | 15.0 | 6.1 | 55.0 | 5.5 | 33.7 | 19.2 | 8.8 | 13.2 | 0.6 | 0.4 | 0.3 |
| 36 | 15.0 | 6.1 | 57.5 | 5.5 | 33.7 | 19.0 | 9.0 | 12.6 | 0.7 | 0.5 | 0.3 |
| 37 | 14.6 | 4.7 | 62.1 | 3.1 | 95.0 | 27.6 | 16.7 | 12.1 | 0.4 | 1.2 | 2.5 |
| 38 | 14.6 | 4.7 | 62.1 | 3.1 | 92.5 | 28.2 | 15.9 | 11.8 | 0.4 | 1.3 | 2.4 |
| 39 | 9.5 | 5.7 | 61.3 | 3.3 | 100.0 | 23.9 | 15.4 | 15.7 | 0.4 | 2.2 | 2.3 |
| 40 | 90.0 | 12.0 | 12.0 | 0.0 | 0.0 | 19.0 | 42.3 | 17.4 | 1.3 | 0.8 | 3.8 |
| 41 | 24.2 | 19.9 | 25.0 | 0.0 | 0.0 | 47.0 | 39.8 | 37.3 | 3.6 | 4.2 | 3.4 |

The solar radiation absorbing metallic layers and the dielectric layers are applied via a cathodic sputtering technique under usual conditions for this type of technique. As a variant, the dielectric layers are applied via the well-known technique known as PECVD (plasma-enhanced chemical vapor deposition).

The silicon nitride dielectric layers are produced from metal targets in an atmosphere consisting of a mixture of argon (30-70%) and nitrogen (70-30%) at a total pressure of 4 mTorr (0.53 Pa). The chromium-zirconium (40% by weight of Cr and 60% of zirconium in the CrZr alloy) layers are deposited from metal cathodes in an atmosphere of argon alone. As a variant, the deposition atmosphere of this CrZr metal alloy comprises a small amount of nitrogen or oxygen originating from the neighboring deposition zones. As a result, the formed CrZr layer, while conserving its essentially metallic nature, contains a small amount of nitrogen or oxygen. The properties obtained are similar. The silicon oxide dielectric layers are produced starting with a silicon-based target in an atmosphere containing argon and oxygen.

The substrate-side light transmission TL and light reflection are measured on the samples with the illuminant D65, 2°. The CIE colorimetric coordinates L*, a* and b* are also measured before and after heat treatment with the illuminant D65, 10°. The angle at which the measurements are taken is 8°.

The samples are subjected to a heat treatment comprising maintaining at 670° C. for 7 minutes 30 seconds. The transmission and reflection variations in ΔE* are also given in the tables. In the examples, the notations SiN denote the silicon nitrides without representing a chemical formula, it being understood that the products obtained are not necessarily rigorously stoichiometric, but are those obtained under the indicated deposition conditions and which are in the region of the stoichiometric products. The SiN layers may contain up to a maximum of about 10% by weight of aluminum originating from the target. The dielectric layer according to the invention may furthermore consist of a plurality of individual layers comprising or essentially consisting of the above materials.

The mechanical strengths and chemical resistances of the glazings according to the invention without a silver-based layer are characterized by successfully passing the tests defined in standard EN1096-2 for class B coatings. In addition, the glazings according to the invention also satisfy the requirements of the following tests:

the salt spray test (NSS: Neutral Salt Spray) according to standard ISO 9227-2006, preferably for at least 10 days;

the air-conditioned chamber test according to standard EN1036-2008, preferably for at least 10 days; and the Cleveland test according to standard ISO 6270-1: 1998, preferably for at least 10 days;

the acid resistance test ($SO_2$) according to standard EN 1096-2;

the AWRT test (Automatic wet rub test) described below: A piston covered with a cotton cloth is brought into contact with the layer to be evaluated and moved back and forth over its surface. The piston bears a weight so as to apply a force of 33 N to a finger having a diameter of 17 mm. The rubbing of the cotton over the coated surface damages (removes) the layer after a certain number of cycles. The test is used to define the limit at which the layer discolors (partial removal of the layer) and scratches appear therein. The test is carried out for 10, 50, 100, 250, 500 and 1000 cycles in various separate locations on the sample. The sample is observed under an artificial sky in order to determine whether discoloring or scratching is visible on the sample. The AWRT result indicates the number of cycles resulting in no or very little degradation (invisible to the naked eye under a uniform artificial sky at a distance of 80 cm from the sample);

the dry brush test (DBT) according to standard ASTM D2486-00 (test method "A"), preferably for at least 1000 cycles, this being measured before and after optional heat treatment.

TABLE II

The examples that follow were performed with other proportions of Cr and of Zr in the solar radiation absorbing metal alloy. As for the preceding examples, the example numbers bearing the letter ("R") are comparative examples, and the numbers without this letter are examples according to the invention. The results (OK for good; KO for unacceptable; and S for satisfactory) for two chemical resistance tests are also indicated: air-conditioned chamber (CC) and Cleveland test (Clev).

The same structure below was used: 30 nm SiN/15 nm functional layer/30 nm SiN (SiN means $Si_3N_4$, optionally doped with aluminum to make the starting silicon target conductive). The various layers are deposited in the same manner as in the preceding examples. The constitution of the functional layer is given in table II below. The Cr and Zr percentages relative to the total alloy are given on a weight basis.

| Ex. | Functional layer | $\Delta E^*_{Tl}$ | $\Delta E^*_{Rl}$ | $\Delta E^*_{Rg}$ | TL | Rl | Rg | CC | Clev |
|---|---|---|---|---|---|---|---|---|---|
| 5 | 80% Cr/20% Zr | 1.44 | 1.44 | 1.55 | 21 | 30 | 28 | OK | OK |
| 6 | 60% Cr/40% Zr | 0.94 | 1.65 | 1.80 | 24 | 27 | 25 | OK | OK |
| 7 | 40% Cr/60% Zr | 0.63 | 1.43 | 1.46 | 26 | 25 | 22 | OK | OK |
| 8 | 25% Cr/75% Zr | 2.44 | 3.56 | 2.42 | 26 | 26 | 21 | OK | OK |

TABLE III

The comparative example and the example according to the invention of multilayer stacks, deposited on a glass substrate, reproduced in table III below present an additional silver-based metallic layer which is inserted between two solar radiation absorbing metallic layers. The notation conventions are the same as for the preceding tables.

| Ex. | Coating | TL | Rl | Rg | $\Delta E^*_{Tl}$ | $\Delta E^*_{Rg}$ | CC | Clev |
|---|---|---|---|---|---|---|---|---|
| 5R | SiN (40 nm)/NiCr (1 nm)/Ag (18 nm)/NiCr (1 nm)/SiN (56 nm) | 54 | 13 | 24 | 2.26 | 1.88 | OK | OK |
| 9 | SiN (40 nm)/CrZr (1 nm)/Ag (18 nm)/CrZr (1 nm)/SiN (56 nm) | 59 | 15 | 23 | 1.61 | 1.03 | OK | OK |

The variation in the thicknesses of the dielectric layers, within reasonable limits, does not significantly affect the modification of the tint during the heat treatment, or the durability, but, of course, it does modify the starting esthetic appearance (and in particular the tint).

As for the preceding examples, the solar radiation absorbing metallic layers, the silver-based additional metallic layers and the dielectric layers are applied via a cathodic sputtering technique under usual conditions for this type of technique. As a variant, the dielectric layers are applied via the well-known technique known as PECVD (plasma-enhanced chemical vapor deposition).

TABLE IV

Examples 10-17 of the multilayer stack, deposited on a glass substrate, reproduced in table IV below relate more particularly to the embodiment of the invention in which the light reflection on the substrate side is high, and in particular higher than the light reflection on the multilayer-stack side. The solar radiation absorbing layer is an alloy comprising 40% chromium and 60% zirconium. The notation conventions are the same as for table I. The figures in parentheses are the physical thicknesses in nm for the various layers. The properties (in % for the light transmission and reflection) are given in monolithic glazing after heat treatment. The name "TZO" represents a mixed oxide comprising 50% $TiO_2$ and 50% $ZrO_2$.

| Ex. | Coating | TL | Rl | Rg |
|---|---|---|---|---|
| 10 | SiN (13)/CrZr (6.7)/SiN (50.6) | 33.8 | 7.4 | 34.6 |
| 11 | SiN (13)/CrZr (10.3)/SiN (46.7) | 23.5 | 13.8 | 39.9 |
| 12 | SiN (17)/CrZr (17)/SiN (40) | 12.6 | 29.2 | 45.5 |
| 13 | SiN (79.2)1 CrZr (14)/SiN (50.1) | 22.2 | 15 | 30.9 |
| 14 | SiN (16.4)/CrZr (7.6)/TZO (24.1)/SiN (25) | 31.3 | 8.6 | 39 |
| 15 | SiN (13)/CrZr (11.6)/TZO (21.4)/SiN (25) | 21.6 | 12.7 | 44.7 |
| 16 | SiN (13.4)/CrZr (21.3)/TZO (18.2)/SiN (31.3) | 10.8 | 15.7 | 51.2 |
| 17 | SiN (78)/CrZr (14.7)/TZO (22.5)/SiN (25.1) | 22 | 13.4 | 33 |

Table Va below gives examples with two additional silver-based metallic layers, the solar radiation absorbing layer being in the first dielectric coating arranged between the substrate and the first silver-based layer. The various layers are deposited under the same conditions as for the examples of table I. The properties are measured in the same manner and are given in table Vb. The examples of table Va also underwent a heat treatment identical to that described for the examples of table I and the variations in the properties are, in the same manner, given in $\Delta E^*$, either in transmission $\Delta E^*_{Tl}$ (or $\Delta E^*_{tr}$), or in layer-side reflection ($\Delta E^*_{Rl}$), or in glass substrate-side reflection ($\Delta E^*_{Rg}$). Furthermore, the coordinates L*, a*, b* and Y (which represents either the total light transmission or the total light reflection) are also indicated as transmission (TL), as glass substrate-side reflection (Rg) and as layer-system-side reflection (Rl), and also the variation in total light transmission ($\Delta_{TL}$), and the variation in glass substrate-side ($\Delta_{Rg}$) and layer-system-side ($\Delta_{Rl}$) total reflection. The name ZSO5 represents a mixed zinc-tin oxide formed from a cathode of a zinc-tin alloy containing 52% by weight of zinc and 48% by weight of tin to form the spinel structure of zinc stannate $Zn_2SnO_4$. The term "AZO" refers to a zinc oxide doped with aluminum, obtained by cathode sputtering, from a ceramic cathode formed by the oxide to be deposited, under a neutral or slightly oxidizing atmosphere. As a variant, AZO may be replaced with other barriers that are well known in the field and suited to the desired properties for the formed layer system, for instance a Ti oxide, which is undoped or doped with niobium or zirconium, preferably obtained from a ceramic target formed from the oxide to be deposited, or pure ZnO. B represents a layer acting as a barrier to the oxidation of silver, which is well known in the field. D represents one or more dielectric layers, especially based on zinc stannate, doped or undoped ZnO, or another material known in the field, which is suited to this type of layer stacking, for example a nitride such as AlN. M represents the wetting layer based on ZnO, which is undoped or doped with aluminum. IR represents the functional layers that reflect infrared radiation. ABS represents the solar radiation absorbing layer.

The examples given in table VIa are, in the same manner, examples with two additional silver-based metallic layers as for table Va, but this time the solar radiation absorbing layer is in the second dielectric coating arranged between the first silver-based layer and the second silver-based layer. The properties obtained are given in table VIb in the same manner as for table Vb. The name $TZO_{65}$ means a mixed titanium-zirconium oxide with 35% zirconium and 65% titanium, different from TZO (50/50).

Table VIIa below gives examples with three additional silver-based metallic layers, the solar radiation absorbing layer being in the first dielectric coating arranged between the substrate and the first silver-based layer. The corresponding properties are given in table VIIb, as single glass, for a clear glass substrate 6 mm thick, not heat-treated. The solar factor value (g) is also indicated.

Table VIIIa below also gives examples with three additional silver-based metallic layers, but this time the solar radiation absorbing layer is in the second dielectric coating arranged between the first silver-based layer and the second silver-based layer. The corresponding properties are given in table VIIIb, as single glass, for a clear glass substrate 6 mm thick, not heat-treated. The solar factor value (g) is also indicated.

Needless to say, the invention is not limited to the implementation examples mentioned.

TABLE Va

| Ex. | D1a SiN | ABS CrZr | D1b SiN | ZSO5 | ZnO | M Ag | B AZO | D2 ZSO5 | SiN | ZSO5 | ZnO | M Ag | B AZO | ZSO5 | SiN | D3 TZO |
|---|---|---|---|---|---|---|---|---|---|---|---|---|---|---|---|---|
| 42 | 10 | 0.9 | 10 | 8 | 5 | 10.5 | 5 | 15.35 | 35 | 15.35 | 5 | 14.7 | 5 | 11.7 | 20 | 3 |
| 43 | 10 | 1.2 | 10 | 10.4 | 5 | 11.4 | 5 | 14.2 | 35 | 14.2 | 5 | 14.9 | 5 | 11.6 | 20 | 3 |
| 44 | 10 | 1.7 | 10 | 12.8 | 5 | 12.6 | 5 | 14.05 | 35 | 14.05 | 5 | 14.8 | 5 | 11.9 | 20 | 3 |

TABLE Vb

| Ex. | $\Delta_{TL}$ | $\Delta_{Rl}$ | $\Delta_{Rg}$ | $\Delta E^*_{TL}$ | $\Delta E^*_{Rl}$ | $\Delta E^*_{Rg}$ | TL Y | L* | a* | b* | Rg Y | L* | a* | b* | Rl Y | L* | a* | b* |
|---|---|---|---|---|---|---|---|---|---|---|---|---|---|---|---|---|---|---|
| 42 | -1.2 | 0.4 | 0.6 | 2.3 | 3.1 | 6.2 | 68.9 | 86.4 | -3.3 | 2.6 | 6.8 | 31.7 | 0.5 | -11.8 | 4.3 | 24.8 | -3.5 | -5.6 |
| 43 | 1.2 | 0.4 | -0.1 | 1.3 | 1.5 | 1.3 | 61.2 | 82.5 | -4.4 | 2.9 | 5.8 | 29.1 | 0 | -9.3 | 4.4 | 25 | 3 | -2.1 |
| 44 | 2.2 | 0.6 | -0.5 | 1.3 | 5.3 | 2.1 | 50.5 | 76.5 | -4.4 | -1.1 | 6.4 | 30.6 | 0.6 | -7.6 | 7.9 | 33.7 | -0.4 | 6.3 |

TABLE VIa

| Ex. | D1 ZSO5 | M ZnO | IR1 Ag | B AZO | D2a ZSO5 | ABS SiN | CrZr | SiN | D2b ZSO5 | M ZnO | IR2 Ag | B AZO | ZSO5 | SiN | P TZO |
|---|---|---|---|---|---|---|---|---|---|---|---|---|---|---|---|
| 45 | 34.0 | 4.0 | 14.7 | 5.5 | 22.5 | 20.0 | 0.6 | 25.0 | 10.5 | 4.0 | 15.5 | 5.5 | 10.5 | 21.0 | 3.0 |
| 46 | 39.0 | 4.0 | 14.1 | 5.5 | 23.8 | 20.0 | 0.9 | 25.0 | 11.5 | 4.0 | 15.5 | 5.5 | 10.2 | 21.0 | 3.0 |
| 47 | 39.0 | 4.0 | 16.6 | 5.5 | 22.7 | 20.0 | 1.3 | 25.0 | 10.7 | 4.0 | 16.5 | 5.5 | 10.3 | 21.0 | 3.0 |

| Ex. | ZSO5 | ZnO | Ag | AZO | ZSO5 | SiN | CrZr | SiN | $TZO_{65}$ | ZnO | Ag | AZO | ZSO5 | SiN | TZO |
|---|---|---|---|---|---|---|---|---|---|---|---|---|---|---|---|
| 48 | 38.0 | 4.0 | 14.1 | 5.5 | 24.1 | 20.0 | 0.9 | 25.0 | 10.0 | 4.0 | 15.5 | 5.5 | 9.9 | 21.0 | 3.0 |

| Ex. | ZSO5 | ZnO | Ag | AZO | ZSO5 | SiN | CrZr | SiN | ZSO5 | $TZO_{65}$ | ZnO | Ag | AZO | ZSO5 | SiN | TZO |
|---|---|---|---|---|---|---|---|---|---|---|---|---|---|---|---|---|
| 49 | 42 | 4 | 14.1 | 5.5 | 24.8 | 20 | 09 | 25 | 9.2 | 3 | 4 | 15.5 | 5.5 | 8.4 | 21 | 3 |

TABLE VIb

| Ex. | $\Delta_{TL}$ | $\Delta_{Rl}$ | $\Delta_{Rg}$ | $\Delta E^*_{TL}$ | $\Delta E^*_{Rl}$ | $\Delta E^*_{Rg}$ | TL Y | L* | a* | b* | Rg Y | L* | a* | b* | Rl Y | L* | a* | b* |
|---|---|---|---|---|---|---|---|---|---|---|---|---|---|---|---|---|---|---|
| 45 | 2.0 | 1.4 | 0.8 | 0.9 | 3.9 | 2.7 | 60.3 | 81.9 | -4.1 | 4.8 | 11.9 | 41.2 | -2.6 | -8.0 | 6.9 | 32.0 | -2.2 | -16.2 |
| 46 | 1.2 | 1.8 | 0.3 | 1.5 | 4.4 | 2.5 | 55.9 | 79.6 | -4.5 | 3.6 | 12.3 | 41.8 | -2.2 | -4.8 | 5.9 | 29.6 | 0.6 | -16.4 |
| 47 | 1.0 | 2.1 | -0.4 | 2.1 | 5.4 | 1.4 | 39.3 | 69.0 | -5.8 | 1.8 | 20.7 | 52.6 | -1.3 | 1.1 | 7.6 | 33.7 | 5.4 | -18.9 |
| 48 | -0.7 | 2.0 | -0.1 | 2.0 | 5.2 | 2.2 | 55.9 | 79.6 | -4.4 | 3.7 | 12.3 | 41.8 | -1.9 | -4.9 | 5.9 | 29.6 | 0.5 | -15.4 |
| 49 | 2.8 | 1.6 | -0.8 | 1.6 | 4.7 | 2.0 | 55.9 | 79.6 | -4.6 | 3.5 | 12.3 | 41.8 | -2.3 | -4.7 | 5.9 | 29.6 | 0.4 | -17.4 |

TABLE VIIa

| Ex. | D1a SiN | ABS CrZr | D1b SiN | | M ZSO5 | IR1 ZnO | B Ag | D2 AZO | | ZSO5 | SiN | M ZSO5 | IR2 ZnO | Ag |
|---|---|---|---|---|---|---|---|---|---|---|---|---|---|---|
| 50 | 16.2 | 1.8 | 13.4 | 1.1 | 5 | 11.5 | 4 | 20 | | 20 | 21.1 | 5 | 15.2 | |
| 51 | 16.2 | 1.8 | 13.4 | 1.1 | 5 | 11.5 | 4 | 61.1 | | 0 | 0 | 5 | 15.2 | |

| Ex. | B AZO | D3 ZSO5 | SiN | ZSO5 | M ZnO | IR3 Ag | B AZO | D4 ZSO5 | SiN |
|---|---|---|---|---|---|---|---|---|---|
| 50 | 4 | 15 | 17 | 29.1 | 5 | 16.2 | 4 | 14 | 18 |
| 51 | 4 | 32 | 0 | 29.1 | 5 | 16.2 | 4 | 14 | 18 |

TABLE VIIb

| Ex. | g | $\Delta E^*_{TL}$ | $\Delta E^*_{Rl}$ | $\Delta E^*_{Rg}$ | TL Y | L* | a* | b* | Rg Y | L* | a* | b* | Rl Y | L* | a* | b* |
|---|---|---|---|---|---|---|---|---|---|---|---|---|---|---|---|---|
| 50 | 37 | 3 | 4 | 8 | 36.5 | 80 | −6 | −0.8 | 6.7 | 31.1 | −3.9 | −0.9 | 2.9 | 19.6 | 12.8 | −9 |
| 51 | 37 | 3 | 4 | 8 | 36.5 | 80 | −6 | −0.8 | 6.7 | 31.1 | −3.9 | −0.9 | 2.9 | 19.6 | 12.8 | −9 |

TABLE VIIIa

| Ex. | D1 ZSO5 | M ZnO | IR1 Ag | B AZO | D2a ZSO5 | SiN | ABS CrZr | D2b SiN | ZSO5 | M ZnO | IR2 Ag | B AZO | D3 ZSO5 | SiN | ZSO5 | M ZnO | IR3 Ag | B AZO | D4 ZSO5 | SiN |
|---|---|---|---|---|---|---|---|---|---|---|---|---|---|---|---|---|---|---|---|---|
| 52 | 17.7 | 5 | 9.2 | 4 | 19 | 20 | 0.8 | 15 | 10 | 5 | 15.1 | 4 | 20 | 20 | 25.8 | 5 | 15.5 | 4 | 14 | 18.9 |

TABLE VIIIb

| Ex. | g | $\Delta E^*_{TL}$ | $\Delta E^*_{Rl}$ | $\Delta E^*_{Rg}$ | TL Y | L* | a* | b* | Rg Y | L* | a* | b* | Rl Y | L* | a* | b* |
|---|---|---|---|---|---|---|---|---|---|---|---|---|---|---|---|---|
| 52 | 37.5 | 1.5 | 7.1 | 3.5 | 57 | 80.3 | −5.9 | −1.5 | 5.1 | 27.1 | 1.6 | −5.8 | 4.1 | 24.8 | 5.4 | −13.5 |

The invention claimed is:

1. A solar-control glazing, comprising:
a glass substrate;
a multilayer stack comprising a first dielectric layer, a second dielectric layer, and a solar radiation-absorbing layer, wherein
said multilayer stack is present on the glass substrate,
said solar radiation-absorbing layer is present between said first dielectric layer and said second dielectric layer,
the solar radiation-absorbing layer is a metal alloy layer that comprises zirconium and chromium, said zirconium and chromium together being present in an amount greater than 60 wt % of said solar radiation-absorbing layer, and
each of the first dielectric layer and the second dielectric layer comprises a compound selected from the group consisting of silicon oxide, aluminum oxide, silicon nitride, aluminum nitride, a mixed aluminum-silicon nitride, silicon oxynitride, and aluminum oxynitride.

2. The glazing of claim 1, wherein the solar radiation-absorbing layer comprises from 25% to 75% by weight of zirconium.

3. The glazing of claim 2, wherein the solar radiation-absorbing layer comprises from 45% to 65% by weight of zirconium.

4. The glazing of claim 3, wherein the solar radiation-absorbing layer has a geometrical thickness of between 10 nm and 25 nm.

5. The glazing of claim 1, wherein the solar radiation-absorbing layer has a geometrical thickness of between 0.5 nm and 30 nm.

6. The glazing of claim 4, wherein the solar radiation-absorbing layer has a geometrical thickness of between 0.5 nm and 10 nm.

7. The glazing of claim 1, wherein the first dielectric coating has an optical thickness of at least 10 nm and of not more than 200 nm.

8. The glazing of claim 1, wherein the second dielectric coating has an optical thickness of at least 15 nm and of not more than 200 nm.

9. The glazing of claim 1, wherein the multilayer stack comprises at least two solar radiation-absorbing layers.

10. The glazing of claim 1, wherein the multilayer stack further comprises at least one silver-based metallic layer such that the silver-based metallic layer is surrounded by dielectric coatings.

11. The glazing of claim 10, wherein
at least one of the dielectric coatings surrounding the silver-based metallic layer comprises at least two dielectric layers and the solar radiation-absorbing layer is inserted between said at least two dielectric layers of said dielectric coating.

12. The glazing of claim 11, wherein the at least two dielectric layers sandwiching the solar radiation-absorbing metallic layer are based on silicon nitride or aluminum nitride.

13. The glazing of claim 12, wherein the multilayer stack comprises the following succession:
a layer of silicon nitride or of aluminum nitride/a solar radiation-absorbing layer/a layer of silicon nitride or of aluminum nitride/a layer of intercalating transparent oxide based on Zn, Sn, Ti or Zr oxide, or a mixture thereof, different from a wetting layer/a wetting layer based on zinc oxide/a silver metallic layer.

14. The glazing of claim 13, wherein the solar radiation-absorbing metallic layer has a geometrical thickness of between 0.5 and 8 nm.

15. The glazing of claim 13, wherein the intercalating transparent oxide is a mixed zinc-tin oxide or a mixed titanium-zirconium oxide.

16. The glazing of claim 10, wherein the at least one silver-based metallic layer is located in the stack directly over and/or under the solar radiation-absorbing metallic layer.

17. The glazing of claim 10, wherein the at least one silver-based metallic layer has a thickness of at least 9 nm.

18. The glazing of claim 10, wherein the solar radiation-absorbing metallic layer has a geometrical thickness of between 0.5 and 8 nm.

19. The glazing of claim 1, in which a colorimetric variation in transmission, $\Delta E^*_{TLr}$, is less than 8, when said glazing is subjected to a temperature of at least 630° C. and of not more than 670° C. for 7 minutes.

20. The glazing of claim 1, in which a colorimetric variation in glass-side reflection, $\Delta E^*_{Rg}$, is less than 8, when said glazing is subjected to a temperature of at least 630° C. and of not more than 670° C. for 7 minutes.

21. The glazing of claim 1, in which a thickness of the solar radiation-absorbing metallic layer is chosen so that light transmission for a substrate consisting of clear glass 4 mm thick is at least equal to 2% and not more than 75%.

22. The glazing of claim 1, in which an optical thickness of the dielectric coatings is chosen so that layer-side reflection is at least 1% and not more than 55%.

23. The glazing of claim 1, wherein substrate-side measured light reflection is at least 27%.

24. The glazing of claim 1, wherein light reflection measured on the substrate side is at least 2 times greater than light reflection measured on layer-system side.

25. A glazed element of a motor vehicle, a glazing element of buildings or a glazed element of a household electrical appliance, comprising the glazing of claim 1.

26. A solar-control glazing, comprising:
a glass substrate; and
a multilayer stack, said multilayer stack further comprising,
a first dielectric layer,
a second dielectric layer,
a solar radiation-absorbing layer, and
a metallic layer comprising silver surrounded by dielectric coatings,
wherein
at least one of the dielectric coatings surrounding the silver-based metallic layer comprises the first and second dielectric layers, and said solar radiation-absorbing layer is present between said first dielectric layer and said second dielectric layer,
said multilayer stack is present on the glass substrate,
the solar radiation-absorbing layer is a metal alloy layer that comprises zirconium and chromium, said zirconium being present in an amount of at least 20 wt % and said chromium being present in an amount of at least 25 wt %, and
each of the first dielectric layer and the second dielectric layer comprises a compound selected from the group consisting of silicon oxide, aluminum oxide, silicon nitride, aluminum nitride, a mixed aluminum-silicon nitride, silicon oxynitride, and aluminum oxynitride.

* * * * *

UNITED STATES PATENT AND TRADEMARK OFFICE
CERTIFICATE OF CORRECTION

PATENT NO. : 9,561,981 B2
APPLICATION NO. : 14/776159
DATED : February 7, 2017
INVENTOR(S) : Stijn Mahieu et al.

It is certified that error appears in the above-identified patent and that said Letters Patent is hereby corrected as shown below:

In the Specification
Column 2, Line 2, "silico-sodio-calcic glasses" should read --soda-lime-silica glass--.
Column 2, Line 51, delete "solar radiation absorbing".
Column 6, Line 57, "sodio-calcic glass" should read --soda-lime-silica glass--.
Column 6, Line 67, "AN" should read --AlN--.

Signed and Sealed this
Sixteenth Day of May, 2017

Michelle K. Lee
*Director of the United States Patent and Trademark Office*